N. D. BJORKLUND.
LANTERN HOLDER.
APPLICATION FILED JAN. 20, 1910.
970,171.
Patented Sept. 13, 1910.
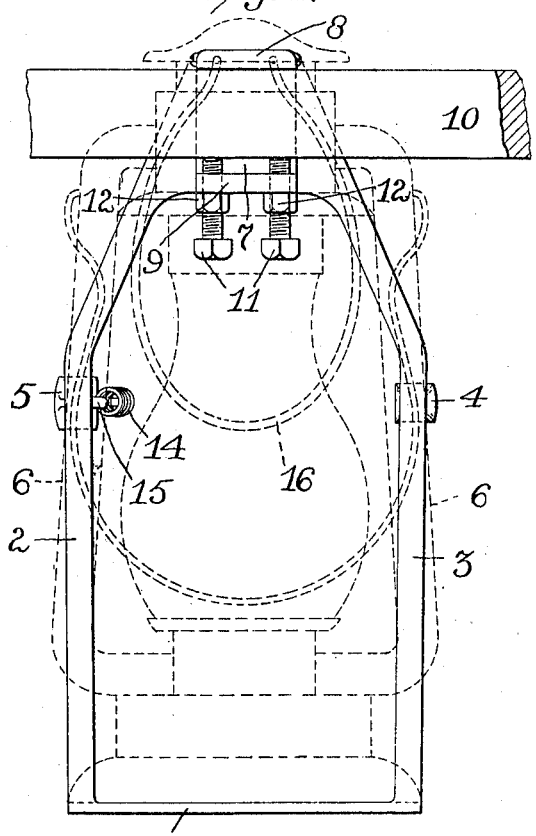
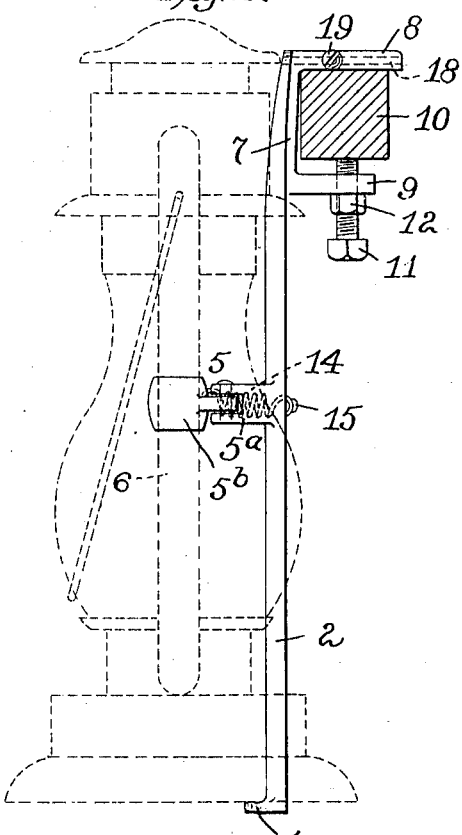
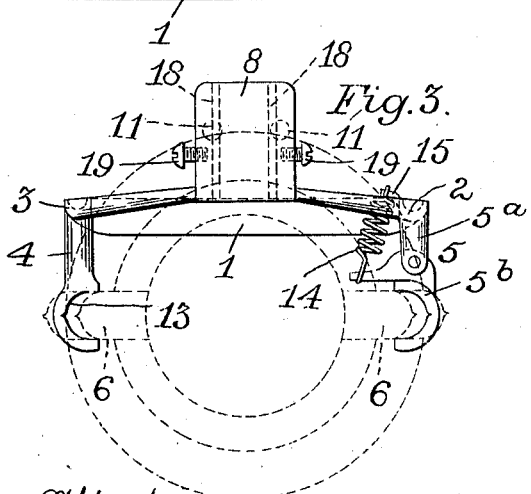
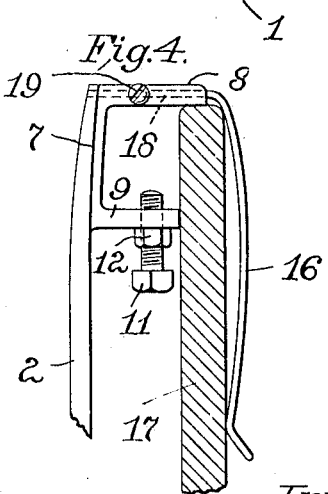
Attest:
Edw. L. Tolson
Edward N. Sarton
Inventor:
Nils D. Bjorklund,
by Spear, Middleton, Donaldson & Spear
attys.

UNITED STATES PATENT OFFICE.

NILS D. BJORKLUND, OF MANCHESTER, NEW HAMPSHIRE.

LANTERN-HOLDER.

970,171.  Specification of Letters Patent.  Patented Sept. 13, 1910.

Application filed January 20, 1910. Serial No. 539,079.

*To all whom it may concern:*

Be it known that I, NILS D. BJORKLUND, citizen of the United States residing at Manchester, New Hampshire, have invented certain new and useful Improvements in Lantern-Holders, of which the following is a specification.

My invention relates to holders for lanterns, and is especially adapted for use on wagons and the like, whereby an ordinary lantern may be rigidly secured to the vehicle at any suitable point on the running-gear, or on the dashboard, although I prefer to attach it to the front axle.

The object of this invention is to provide a holder for a lantern of the ordinary hand type, which may be held rigidly in relation to a vehicle, but which will permit of the lantern being easily secured in place or removed therefrom when so desired.

The invention consists in the combination and arrangement of parts and details of construction hereinafter described and particularly pointed out in the appended claims.

In the accompanying drawings, forming part of this specification:—Figure 1 is a rear elevation of my lantern holder secured on the axle of a vehicle, and showing an ordinary hand lantern in place in dotted lines; Fig. 2 is a side elevation of the same; Fig. 3 is a top plan view detached from the axle and showing the lantern in dotted lines; and Fig. 4 is a detail showing means for attaching the holder to the dashboard or the like.

In these drawings, like numerals of reference designate similar parts throughout the several views.

The holder is simple in construction, and may be cast in one piece, with the exception of the pivotally jointed arm, and may be made of malleable iron or any desired material. It comprises a bottom bar 1 for supporting the lantern, and side bars 2 and 3 which, at points about midway of their height, are provided with forwardly extending arms 4 and 5 to embrace the side tubes 6 of the lantern. The upper ends of the bars 2 and 3 converge into a plate 7, said plate having rearwardly extending upper and lower flanges 8 and 9 adapted to fit an ordinary vehicle axle, represented at 10.

In the lower flange 9 I provide tightening bolts 11 which, when screwed up against the axle and locked there by the lock-nuts 12, secure the holder rigidly in position.

The forwardly extending arm 4 is rigid in relation to the holder-frame, and is suitably grooved at 13 to embrace one of the side tubes 6. The other forwardly extending arm 5 is composed of a stud $5^a$, which has pivoted thereto the bell crank lever $5^b$, the forward end of which embraces the other side tube 6 of the lantern similarly to the arm 4. To the lateral arm of the bell crank is secured one end of a coil spring 14, which is attached at its other end to a pin 15 carried by the side arm 2. This spring and pivot arrangement permits of the lantern being easily put in place or removed therefrom.

Sometimes it may be found more convenient to mount the lantern on the dash board of the vehicle, and for this purpose I provide a spring clip 16 of suitable shape and size to clamp over the dash 17, as shown in Fig. 4. The flanges 8 and 9 assist in this clamping action to secure the holder rigidly in place. The clip 16 is detached from the holder in ordinary use, but is quickly secured in position by passing the ends into holes 18 in the flange 8, and tightening the screws 19 provided for that purpose.

Having thus described my device what I claim as novel and desire to cover by Letters Patent of the United States is:

1. The combination with a tubular hand lantern, of a skeleton frame, a pair of horizontally extending arms carried by the frame to embrace the side tubes of the lantern, one rigid and the other yieldingly pivoted in relation thereto, with means for securing said frame rigidly to the vehicle, substantially as described.

2. In a lantern holder of the class described, a skeleton frame, comprising a bottom supporting bar, a pair of side bars having intermediate of their height horizontally extending arms to embrace the side tubes of a hand lantern, one rigid and the other yieldingly pivoted in relation thereto, said side bars converging into a plate at their upper ends, provided with rearwardly extending flanges adapted to engage with the vehicle axle or other part of the running-gear, and lock-bolts for securing the whole in rigid position, substantially as described.

3. In a lantern of the class described, a skeleton frame comprising a bottom supporting bar, a pair of side bars having, intermediate of their height, horizontally extending arms for embracing the side tubes of a hand lantern, one rigid and the other yieldingly pivoted in relation thereto, said side bars converging into a plate at their upper ends provided with rearwardly extending flanges, and a spring clip removably secured to one of said flanges for engagement with a vehicle dash-board, substantially as described.

In testimony whereof, I affix my signature in presence of two witnesses.

NILS D. BJORKLUND.

Witnesses:
ERNEST A. MERRILL,
FRED T. DUNLAP.